United States Patent [19]
Bumbarger

[11] Patent Number: 5,885,912
[45] Date of Patent: Mar. 23, 1999

[54] PROTECTIVE MULTI-LAYERED LIQUID RETAINING COMPOSITE

[76] Inventor: Thomas H. Bumbarger, 302 Lafayette St., NE., Decatur, Ala. 35601

[21] Appl. No.: 947,184

[22] Filed: Oct. 8, 1997

[51] Int. Cl.$^6$ .................................................... B32B 27/14
[52] U.S. Cl. ...................... 442/239; 442/238; 442/244; 442/245; 442/255; 442/267
[58] Field of Search ..................... 442/239, 267, 442/238, 244, 245, 255; 428/911

[56] References Cited

U.S. PATENT DOCUMENTS

| | | | |
|---|---|---|---|
| 2,855,758 | 10/1958 | Johnson | 62/4 |
| 3,429,138 | 2/1969 | Goldmerstein | 62/259 |
| 3,670,731 | 6/1972 | Harmon | 128/284 |
| 3,971,373 | 7/1976 | Braun | 128/146.2 |
| 4,105,033 | 8/1978 | Chatterjee et al. | 128/285 |
| 4,234,237 | 11/1980 | Mesek et al. | 128/284 |
| 4,429,001 | 1/1984 | Kolpin et al. | 428/283 |
| 4,433,024 | 2/1984 | Eian | 442/267 X |
| 4,530,873 | 7/1985 | Okada | 442/244 X |
| 5,113,666 | 5/1992 | Parrish et al. | 62/259.3 |
| 5,328,759 | 7/1994 | McCormack et al. | 428/283 |
| 5,419,955 | 5/1995 | Ehrhardt et al. | 428/283 |
| 5,486,410 | 1/1996 | Groeger et al. | 428/283 |

*Primary Examiner*—Daniel Zirker
*Attorney, Agent, or Firm*—John C. Garvin, Sr.; James E. Staudt

[57] ABSTRACT

A multi-layered composite comprising a protective layer, a retaining layer, a conductive layer and a filler layer intermediate the retainer and conductive layers. The filler layer is impregnated with liquid absorbent particles. A protective layer having specific characteristic for protection against extreme temperatures, physical impacts and the like is specifically disclosed for use in combination with the retainer, filler and conductive layers. The protective layer provides additional protection of the person from catastrophic events such as exposure of a person to fire and/or severe impact such as may be caused by gunfire.

15 Claims, 10 Drawing Sheets

PROTECTIVE MULTI-LAYERED LIQUID RETAINING COMPOSITE

FIELD OF THE INVENTION

This invention relates to a multi-layered composite for the fabrication of garments, or a variety of items, such as blankets and compresses, to name a few. A filler layer impregnated with liquid absorbent particles is positioned between layers of selected fabrics. The composite, after being soaked in a liquid, provides a covering which protects and/or comforts the body of a person. The invention protects a person's body from extreme heat or cold as well as from physical injury resulting from impact. The invention is also utilized to control the temperature of a person by providing warming or cooling, as may be needed.

BACKGROUND OF THE INVENTION

Many inventions appear in prior art which relate to providing composites and/or garments for the comfort and/or protection of a persons body. These inventions relate to: heating or cooling of a person's body; keeping the body wet or dry; the protection of the body from outside conditions of extreme heat or cold, as well as to the protection of the body from impact. The use of liquid absorbent composites has been utilized in many ways to aid in the effectiveness of such composites and garments. Examples of U.S. patents relating in one way or another to this art are as follows: U.S. Pat. Nos. 2,855,758; 3,429,138; 3,670,731; 3,971,373; 4,105,033; 4,133,055; 4,235,237; 4,429,001; 4,556,055; 5,113,666; 5,289,695; 5,328,759; 5,419,955; and 5,486,410.

SUMMARY OF THE INVENTION

The present invention addresses needs, such as discussed above, by providing a unique and versatile multi-layered composite. The composite is configured for the fabrication of garments for body temperature control, and for protection of the body of the user from extreme temperatures, as well as from impact injuries. The composite is also well suited for fabrication of items such as blankets, compresses and a variety of items for cooling or heating the body and for protecting the body from intense heat or cold, as well as from physical injury.

More specifically, garments made from the multi-layered composite are extremely effective for use by firemen, law enforcement officers, military personnel and persons such as foundry or bakery workers who are exposed for long periods of time to extremely high temperatures. The garments are also effective for persons exposed to extremely low temperatures. The characteristics of the composite make it particularly well suited for the fabrication of special use blankets. These blankets provide an effective means for cooling or warming the user. More significantly, such blankets provide protection from fire and physical impacts. Catastrophes such as wind storms, fire, and wartime attacks often occur wherein some warning is issued but time does not permit evacuation of bed ridden patients from hospitals or homes for the elderly. Liquid soaked blankets fabricated from the inventive composite will provide an effective protection against burns or impact injuries for such persons. When soaked in a warm liquid, blankets also provide an effective means for warming a person exposed to the cold and in particular for warming a person suffering from hypothermia.

In general terms, the invention includes a basic configuration consisting of: a conductive layer which is adapted for placement in close proximity to, or in direct contact with the body of the wearer; a filler layer impregnated with liquid absorbent particles; a retainer layer for retention of the filler layer between the conductive layer and the retention layer; and if needed, an outside protective layer is attached to, or placed adjacent, the outermost surface of the retention layer. The conductive layer is typically formed of a waterproof but breathable material. The filler layer is formed of a fiberfill batting impregnated with liquid absorbent particles. These particles are typically of the super-absorbent polymer type. For certain applications, an extruded polymer and fiber combination may be utilized for the filler layer. The retainer layer is typically a fabric having a porosity which permits the passage of a liquid, such as water, but which is capable of retention of dry absorbent particles. The protective layer is typically configured to be fire and/or impact resistant. When an application of the composite relates to protection of one's body from high temperatures, the multi-layered composite is soaked in a liquid, such as water until the polymer particles reach a point equal to 50% to 90% of total saturation. This range of saturation requires submersion in water for a period of about 15 to 25 minutes, dependent upon the anticipated outside temperature to which the composite will be subjected. When the application of the composite is for protection from impact, saturation of the particles may be as high as 100%. Where emergency situations require, provisions may be made for storage of garments, or other items fabricated from the composite, in devices which accelerate the required saturation. Such devices may include pressure vessels or tanks in which the temperature of the liquid is held at a temperature most conducive to rapid absorption by the polymer being used. If it is anticipated that sufficient time for soaking may not be available, the composite may also be stored in a pre-soaked condition. As will be more fully understood hereinafter, optimum saturation periods of the absorbent particles will be determined by the intended use, as well as the characteristics and quality of the composite.

For some applications, the multi-layered composite may be utilized in a flat sheet configuration. However, the interconnection of the layers by quilting seams provides the more effective results, particularly with respect to impact protection. This quilting process forms pockets for retention of absorbent particles. After being soaked in water for a pre-determined time, each particle typically expands 100 to 300 times its original size. Because of the characteristics of the polymer particles, effective removal of the water from the polymer can only be accomplished by means of evaporation. After soaking, polymer particles are transformed from a tiny solid particle to an enlarged gelatin-like mass. An attempt to squeeze the water from the polymer mass results in a breakdown of the structural integrity of the particle into smaller pieces which continue to retain the absorbed water. This characteristic provides an effective means for using the polymer mass as a shock absorbing substance.

As is well known, water by itself is considered to be incompressible. Water and many other liquids are used for shock absorbing purposes by encapsulation of the liquid in a container which is sealed except for a small opening which permits expulsion of the water at a controlled rate. To use water per se in such a manner in a fabric garment having numerous individual containers (pockets) would obviously be impractical because the water would leak out through the materials through which the water was admitted. However by holding the water within a polymer, these properties of the water, when retained within the polymer, provide an effective shock absorbing medium. In this invention, a predetermined amount of water saturated polymer particles are encapsulated within a fabric pocket of a predetermined size. By controlling the amount of polymer in proportion to the size of the pocket, a positive pressure will be exerted upon the inner surfaces of the pocket by the expanding polymer particles as they are exposed to water. Thus, it will be readily understood that application of an external compression force to the pocket such as would be caused by an impact to the pocket, will decrease the volume of the pocket. An increase of the internal pressure results as the volume of the pocket is reduced. If the polymer was totally saturated, and assuming the fabric to be water proof, it will also be understood that after partial compression of the pocket, the incompressibility of the water within the polymer particles would cause the pocket to rupture if the force of compression became too great. While some of the energy of impact would be absorbed during this process the abrupt rupture of the pocket would cause immediate loss of all resistance to the impact. To prevent such a rupture, a portion of the pocket fabric is of a porosity which will permit controlled expulsion of the gelatin-like mass which results from saturation of the polymer. The expulsion of the gelatin-like mass occurs as it is forced through the pores of the fabric at a rate sufficient to absorb energy, but to prevent rupture of the pocket. This controlled expulsion of the polymer from the pocket provides an effective means of absorbing the energy created by the impact. As the saturated polymer is compressed and forced through the pores of the material, its structural integrity is rapidly transformed from a gelatin like substance to a nearly liquefied emulsion. This rapid structural transformation requires the application of considerable force. As will be apparent, the application of energy from an impact will be more effectively absorbed if the force of the impact is distributed over a number of pockets. This distribution of impact force is accomplished by a protective layer which is fabricated with a rigidity sufficient to effectively distribute the force in accordance with the severity of an expected impact. Accordingly, the user of a multi-layered composite is provided with an effective protection from impact injuries. As the danger of extreme impacts is increased, such as with police involved with riot control or other hazardous duties, layers of more rigid materials are utilized to provide a means to distribute the energy of an impact to the largest possible number of pressurized pockets. When struck by a gunshot the use of garments of this composite, which includes a ballistic protection layer, has proven to reduce the impact on the wearer by about 20%. It is also pointed out that segments of the protective layer of bullet proof or ballistic type materials may be placed over only the most vulnerable areas of the body. This arrangement provides the desired protection while greatly enhancing the mobility of the user.

Tests of garments fabricated from this composite have been outstanding. As mentioned above, composite garments are readily adaptable to meet the requirements of a variety of applications. As an example, for use of a composite garment by a fireman, the retainer layer may simply be sprayed with a fire repellent coating, or if required, an additional complete or partial discrete layer of fire resistant material may be utilized.

It will be understood that after soaking a composite garment as described above, the composite provides an extremely effective protection to the wearer not only against extreme heat, but also against injury.

BRIEF DESCRIPTION OF THE DRAWING

Reference is now made to the accompanying drawing, which forms a part of the specification of the present invention.

DETAILED DESCRIPTION OF THE INVENTION

Figure 1:
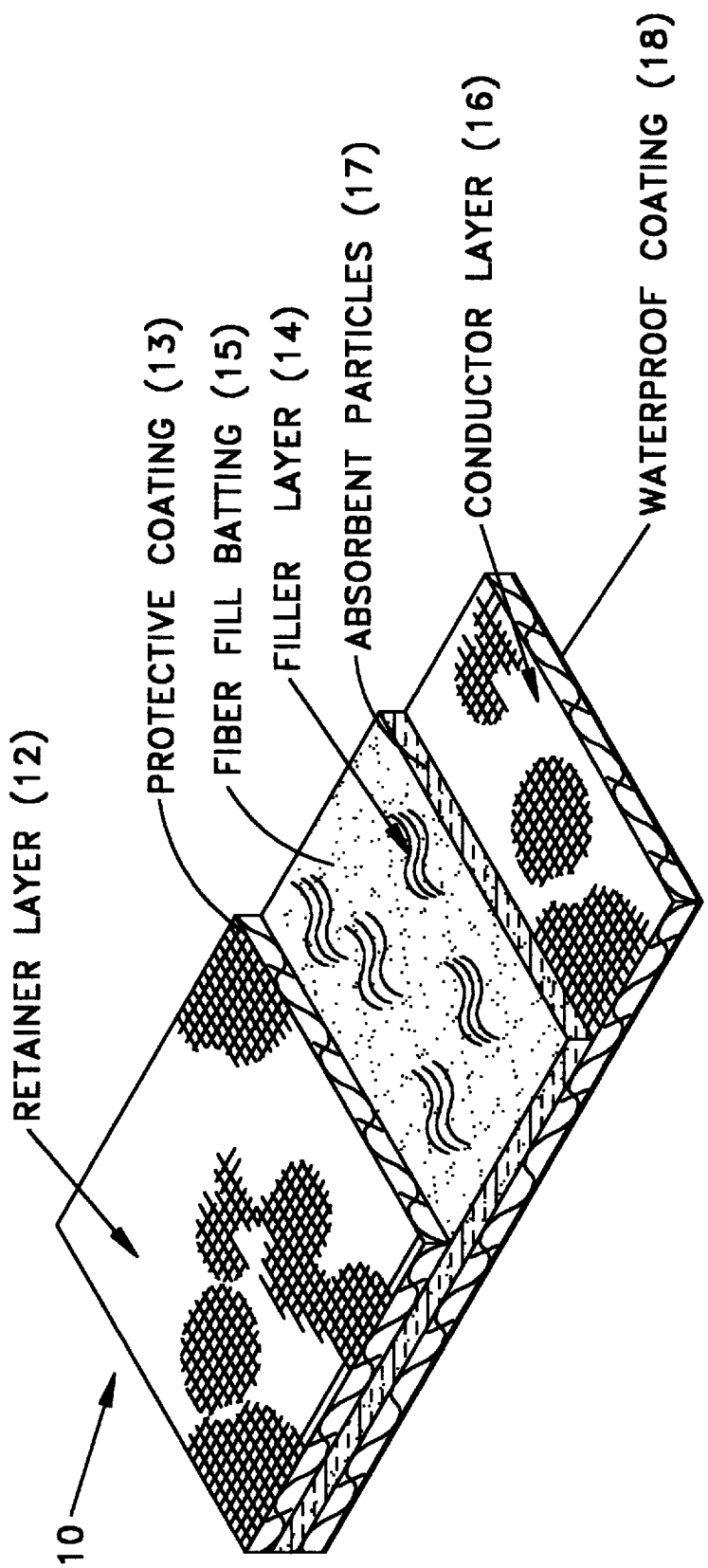
FIG. 1 is a perspective view of one embodiment of a multi-layered composite wherein sections of discrete layers and coatings are illustrated.

Referring now to the drawings, FIG. 1 illustrates a multi-layered composite 10 having a retainer layer 12, a filler layer 14 and a conductor layer 16. The retainer layer 12 is a tightly woven high strength fabric such as "NOMEX" through which a liquid (typically water) must pass. A protective coating 13 is applied to the outer surface of the retainer layer 12. As the name implies, this coating protects the remainder of the composite against damage from external dangers such as fire and/or impact. A variety of fire and impact resistant coatings are readily available, however provisions must be made to permit the passage of liquid either through or around the coating to facilitate the soaking of the absorbent particles. This may be accomplished by piercing the coating with a multitude of minuet punctures. The filler layer 14 is formed of a fiberfill batting 15 which is typically unaffected by the liquid utilized and which retains the tiny absorbent particles 17 which are distributed throughout the batting. The particles 17 are typically a cross-linked polyacrylamide polymer, the absorption capacity of which is about 250 times. The conductor layer 16 may, like the retainer layer 12, be made of a fabric such as NOMEX™. However, most importantly, the inner surface of conductor layer (the surface which in use is to be directly against or in close proximity to a person's body) is covered with a waterproof but breathable coating 18 such as "BREATHE TEX". (It will be noted that hereinafter wherein reference is made to an inner or outer surface of layers in addition to the conductive layer, in each case the inner surface refers to the surface of the layer which is the closer to the conductive layer.) In use, this coating prevents liquid contained within the filler layer from coming in contact with the body of a user and also provides an effective thermal conductor which exposes the body of the user to the approximate temperature of the liquid retaining particles 17. Since the coating is breathable, it will permit the passage of moisture in vapor form from the body of the user to the absorbent particles for absorption thereby. This, of course, assumes that the particles are not totally saturated. In most applications wherein the composite is to be used for body temperature control or protection from extreme external temperatures, the absorbent will be soaked to 50% to 70% of total saturation.

Figure 2:
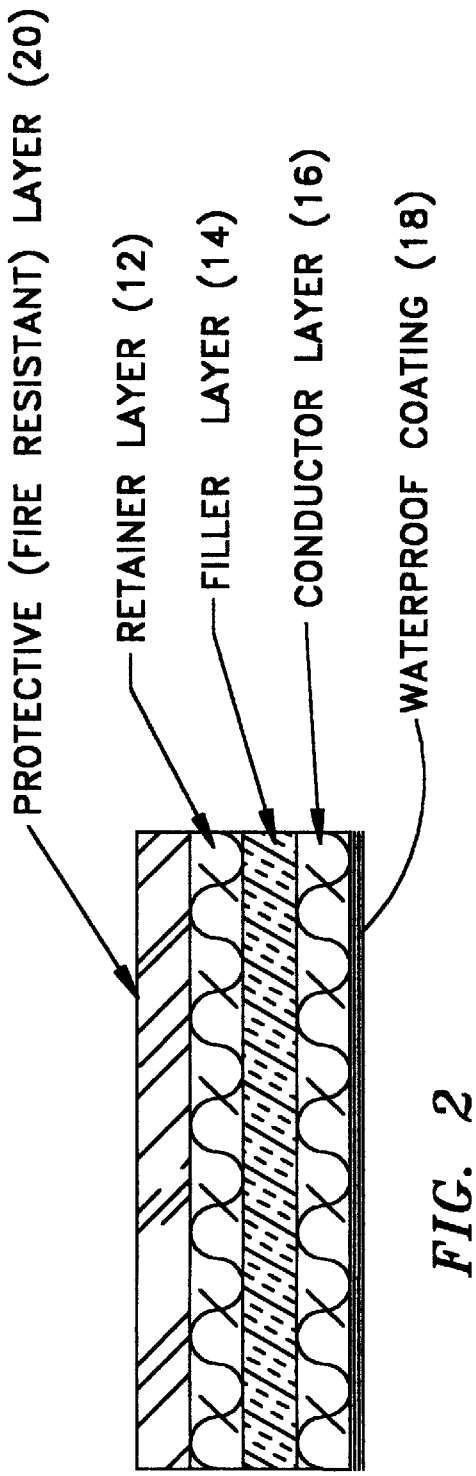
FIG. 2 is a sectional elevation of an embodiment of a multi-layered composite wherein a fire resistant layer is included as a part of the composite.

The composite illustrated in FIG. 2 includes a protective fire resistant layer 20. This discrete layer is utilized for applications wherein it is anticipated that the user will be subjected to fire or heat so extreme as to require the maximum possible fire protection. Examples of such fire resistant materials include "NOMEX" and FR (fire resistant) Cotton. It is noted that the material "NOMEX", suggested above as a basic retainer fabric, is a fire resistant material.

Figure 3:
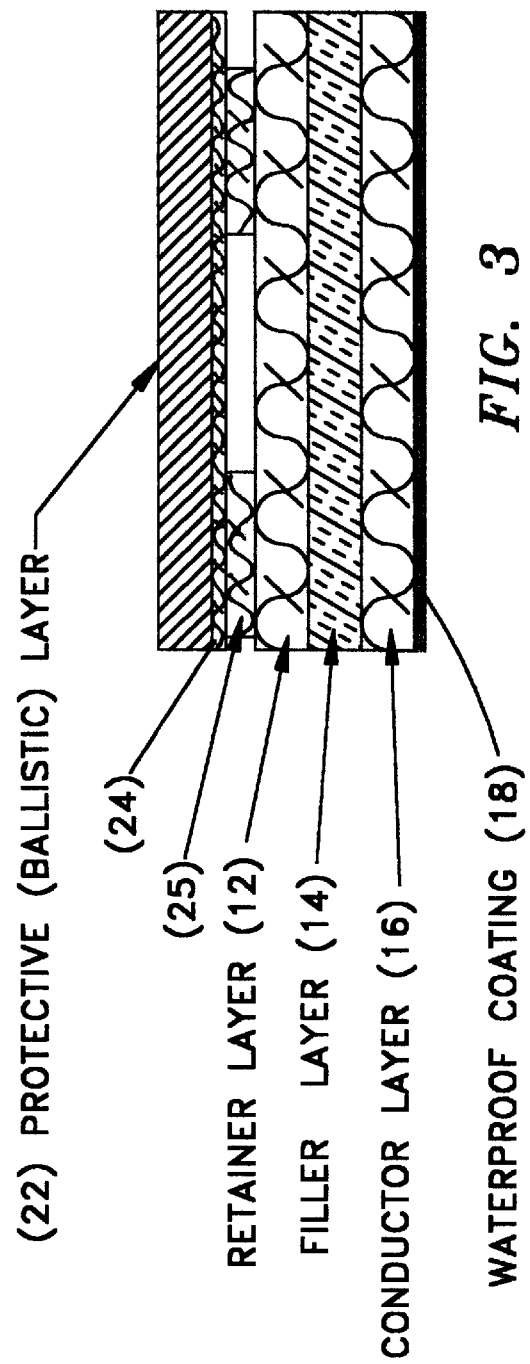
FIG. 3 is a sectional elevation of the composite of FIG. 1 wherein a ballistic layer is included as a part thereof.

The composite illustrated in FIG. 3 includes a protective ballistic layer 22. This discrete layer is utilized for applications wherein it is anticipated that the user will be subjected to gun fire or extreme impacts such as may be experienced by riot police. Typically, the ballistic layer 22 is formed using a "CORDURA" fabric over "Kevlar". This layer is characteristically quite stiff and as such requires special attachment procedures which will be discussed in detail hereinafter. While the ballistic layer may be attached in many suitable ways, FIGS. 3,7,8, and 10–12 illustrate the use of hook and loop fasteners 25 such as "VELCRO". Use of such removable type fasteners permits the temporary attachment of segmented protective layers of ballistic material to other layers of composite garments, such as jackets, in a manner which will also be discussed in greater detail hereinafter.

Figure 4:
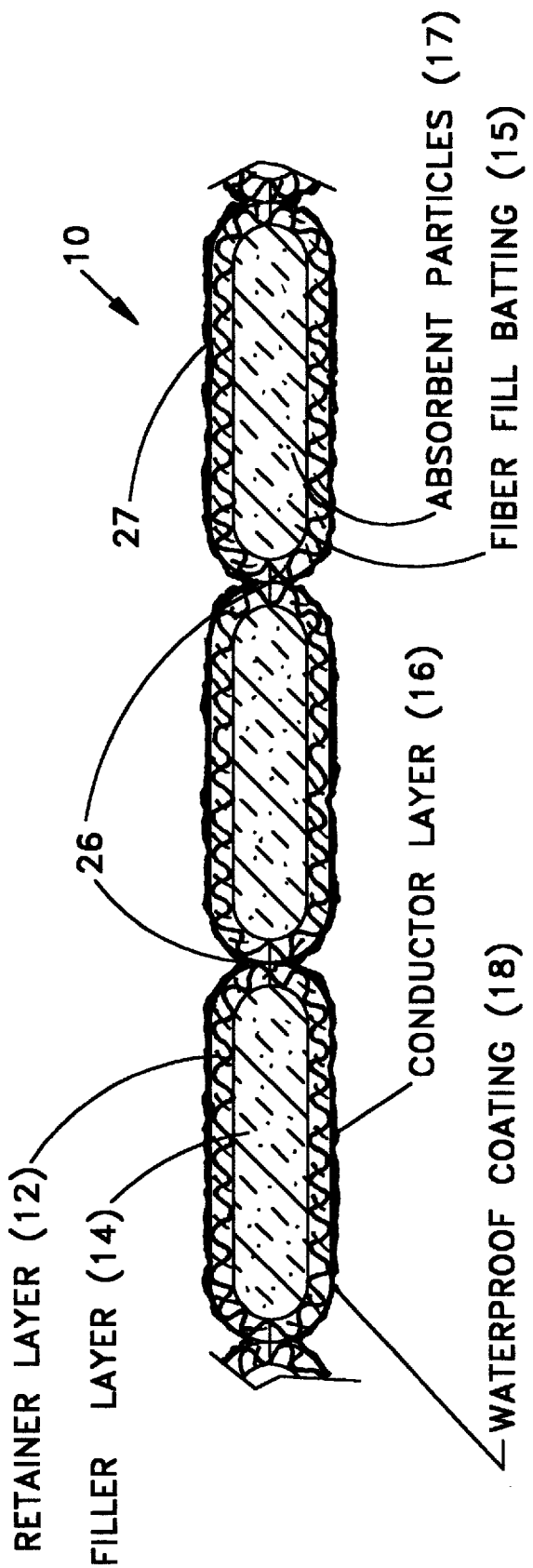
FIG. 4 is a sectional view of a composite prior to soaking wherein the layers thereof have been attached to one another so as to form quilted pockets.
Figure 5:
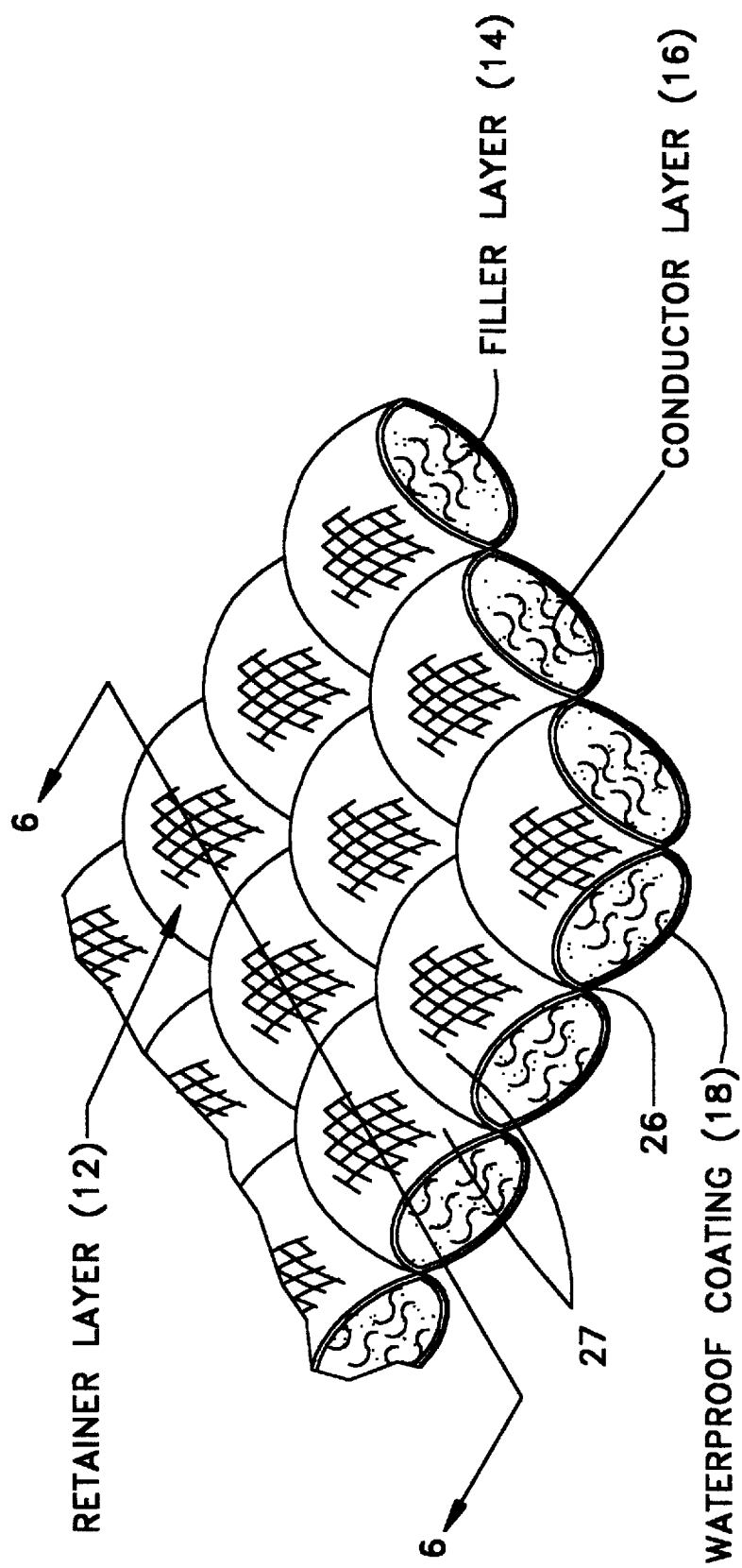
FIG. 5 is a perspective view of a composite wherein the layers thereof have been attached to one another so as to form quilted pockets and wherein the pockets are illustrated in an expanded condition as a result of soaking of the composite.

The composite such as illustrated in FIGS. 1 and 2 is stitched to provide seams 26 in a crossing pattern to form a quilted configuration such as illustrated in FIGS. 4 and 5. As illustrated, closed pockets 27 are formed by the crossing seams 26.

Figure 6:
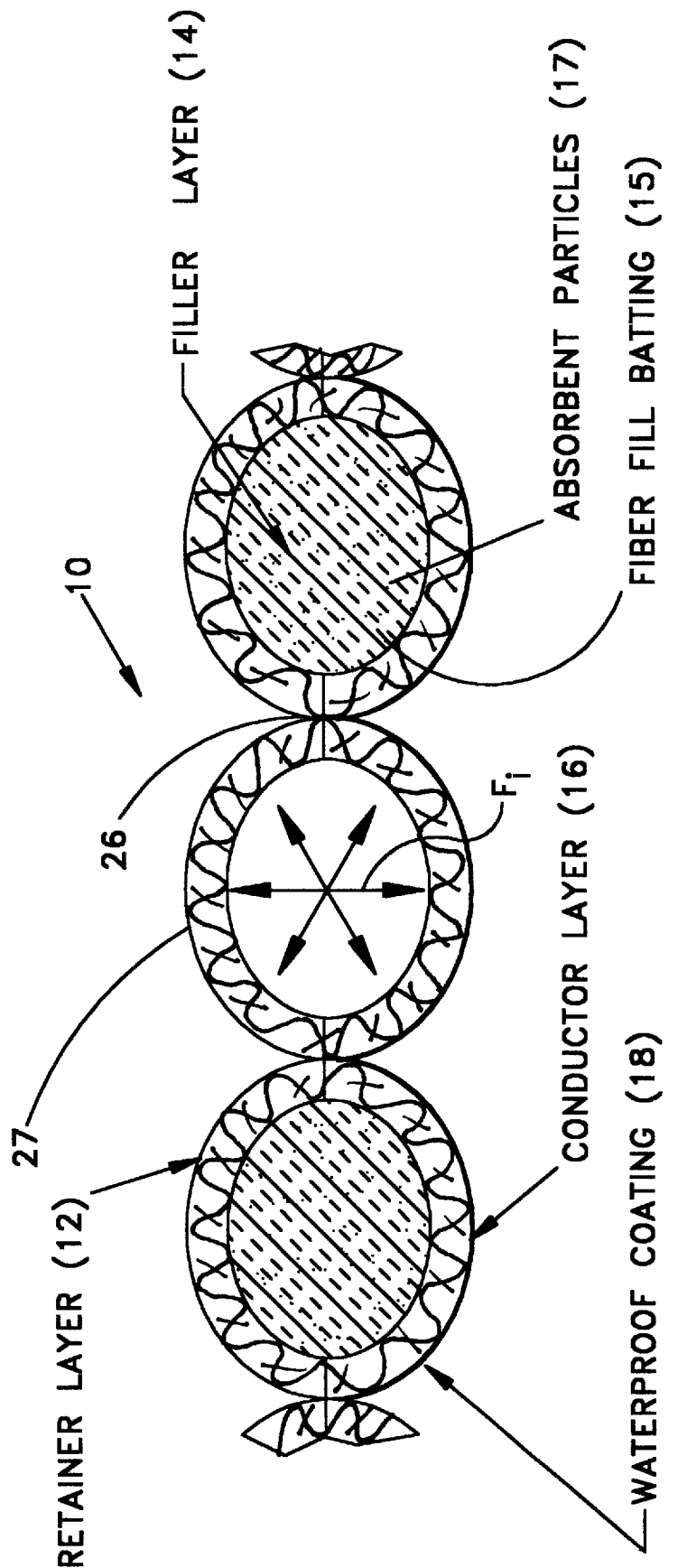
FIG. 6 is a sectional view taken along line 6—6 of FIG. 5 wherein, for illustration purposes only, the filler layer has been omitted from the interior of one pocket to permit inclusion of arrows "Fi" which signify an internal pressure being exerted by the filler layer outwardly against the retainer layer and the conductor layer.

It will be noted that the pockets 27, illustrated in FIG. 4, have yet to be soaked in liquid. In this dry condition the particles 17 are very tiny (1–2 cubic millimeters) and thus occupy an insignificant amount of space within the pockets 27. Accordingly, the retainer and conductor layers 12 and 16 respectively lie substantially flat and experience no internal pressure from the dry particles 17. However, as noted supra, soaking the particles in liquid increases the size of the particles several hundred times. Accordingly, FIGS. 5–11 illustrate the pockets after an appropriate soaking has been accomplished. As illustrated in these figures, after soaking, the absorbent particles have expanded the pockets to the extent that, as illustrated in FIG. 6, an internal pressure "Fi" is exerted against the retainer and conductive layers 12 and 16 respectively.

In a soaked condition, a garment fabricated from the multi-layered composite which is the subject of this invention provides an extremely effective body protection against intense heat. This protection is provided in multiple ways.

First, the retainer layer of the composite may be provided with a heat resistant coating, the function of which is obvious by definition.

Second, the liquid (typically water) contained by the encapsulated particles within the filler layer provides an effective thermal insulator between the retainer layer and the thermally conductive layer adjacent a person's body.

Third, as the retainer layer is exposed to heat the liquid within the filler layer begins to vaporize and pass slowly through the retainer layer thus creating a moist film on the outer surface of the retainer layer. The moisture itself resists the heat and protects the outer surface of the retainer layer.

Fourth, as the moisture on the retainer layer evaporates, an evaporative cooling occurs which further cools the retainer layer. (It will be readily understood that liquid stored within the filler layer will provide a continuation of these cooling processes.)

Fifth, if the user is perspiring, the perspiration will, to a large extent evaporate thus cooling the user. The moisture will then be carried in the form of humid air through the breathable conductive layer and into the filler layer for absorption by the partially saturated absorbent particles. To facilitate this effect, it will be noted that in certain applications the particles are not totally saturated during the soaking process, and that the conductive layer is by design an effective thermal conductor. The conductive layer is also water proof, yet porous enough to be breathable.

A material suitable for use in the conductive layer is "NOMEX" (available from the DuPont Corporation). A coating of "BREATHE TEX" provides a breathable but waterproof covering which is an excellent thermal conductor and provides a cool dry surface to the body of the wearer. "BREATHE TEX" is available from Alden Industries Inc.

A batting material suitable for the filler layer is DuPont "ARMADA" E. 89.

A material suitable for particles impregnated within the filler material is a cross-linked polyacrylamide polymer available from Plant Health Care Inc.

A material suitable for use in a retainer layer is a high grade of cotton. If fire protection without a discrete protective layer is desired, cotton-Fire Resistant (cotton-FR) may be used. This is a cotton fabric which has been sprayed with a fire retardant.

A material suitable for use in as a fire protective layer is "NOMAX" which, as stated above, is available from the DuPont Corporation.

A material suitable for use in an impact protective layer such as would be utilized by persons subjected to gunfire is "CORDURA" and "Kevlar" each of which is available from DuPont Inc.

FIG. 6 is a sectional view taken along the section line 6—6 in FIG. 5. For purpose of illustration, the filler layer has been omitted from one pocket 27. Arrows "Fi" are included within the pocket to illustrate the fact that, after an appropriate soaking, an outward pressure is exerted upon the inner walls of both the retainer and conductor layers 12 and 16 respectively by the absorbent saturated particles 17. To determine an appropriate soaking time, the size and number of the absorbent particles must be predetermined. Parameters such as the pocket size required to provide a predetermined positive pressure within the pockets after the composite has been soaked must also be considered. The required internal pressure "Fi" is dependent upon the intended application of the composite.

Figure 7:
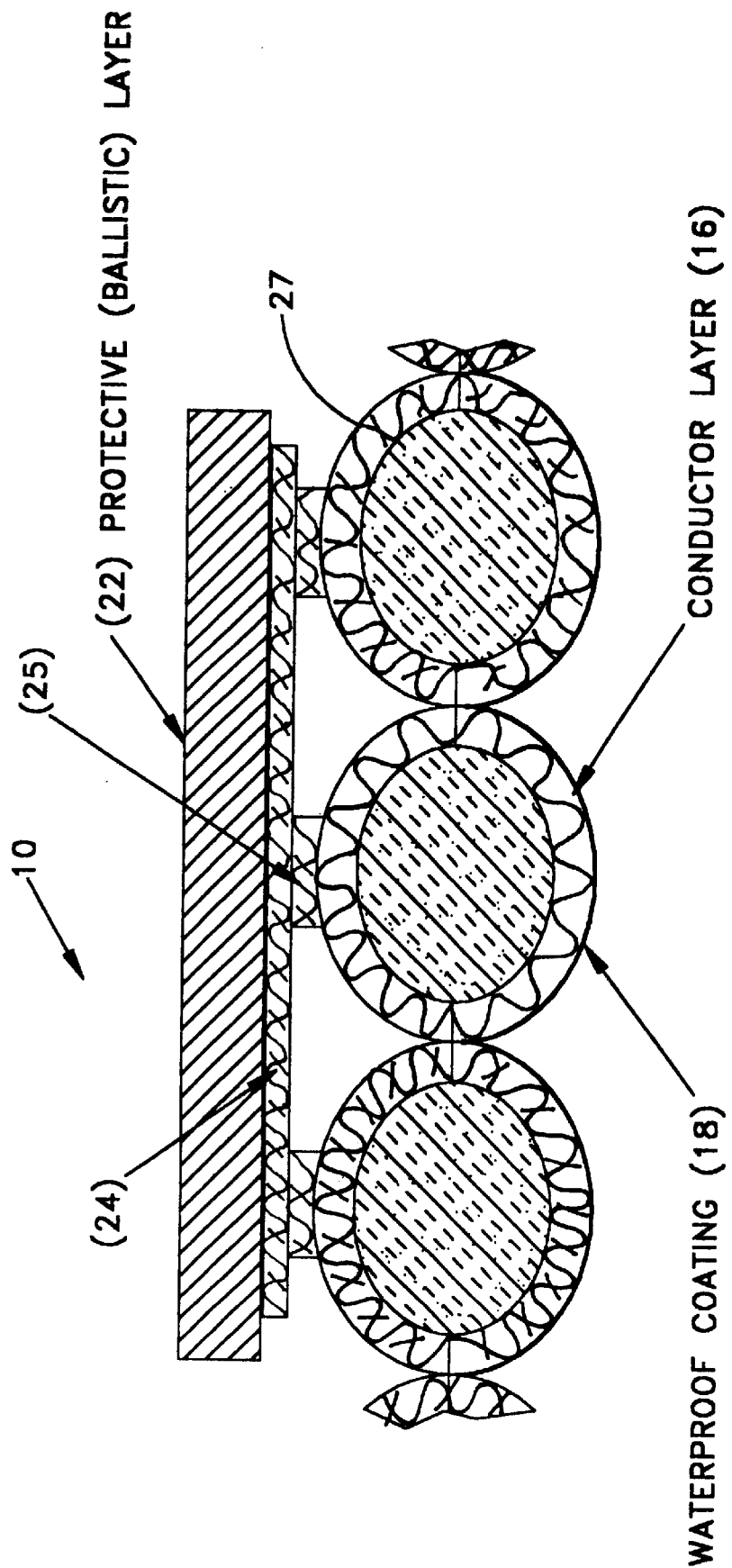
FIG. 7 is a sectional view as in FIG. 6 wherein the quilted pockets are attached to a ballistic layer.

Referring now to FIG. 7, the ballistic layer 22 is illustrated as being attached to the outermost portions of pockets 27 by individual patches 25 of VELCRO. A single sheet 24 of VELCRO is attached to the inner surface of the ballistic layer 22. This arrangement permits placement and attachment of the ballistic layer 22 in any desired position upon the retainer layer 12.

Figure 8:
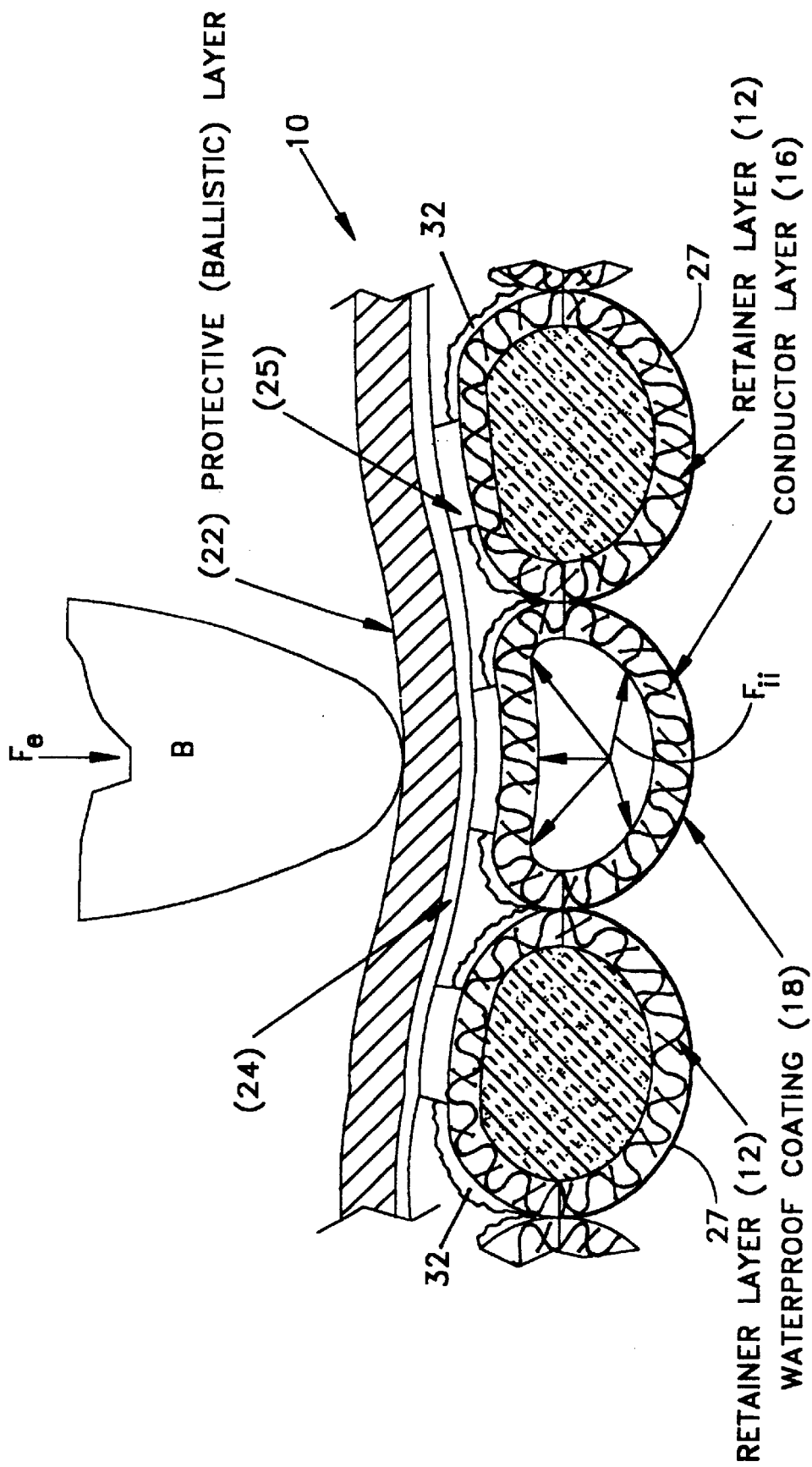
FIG. 8 is a sectional view as in FIG. 7 which illustrates a deformation of the quilted pockets as caused by the impact of a bullet upon a ballistic layer and also, by arrows "Fii", illustrates the increase of pressure within the pockets as a result of the impact from the bullet, and the resultant expulsion of material through the retainer layer of the composite.
Figure 9:
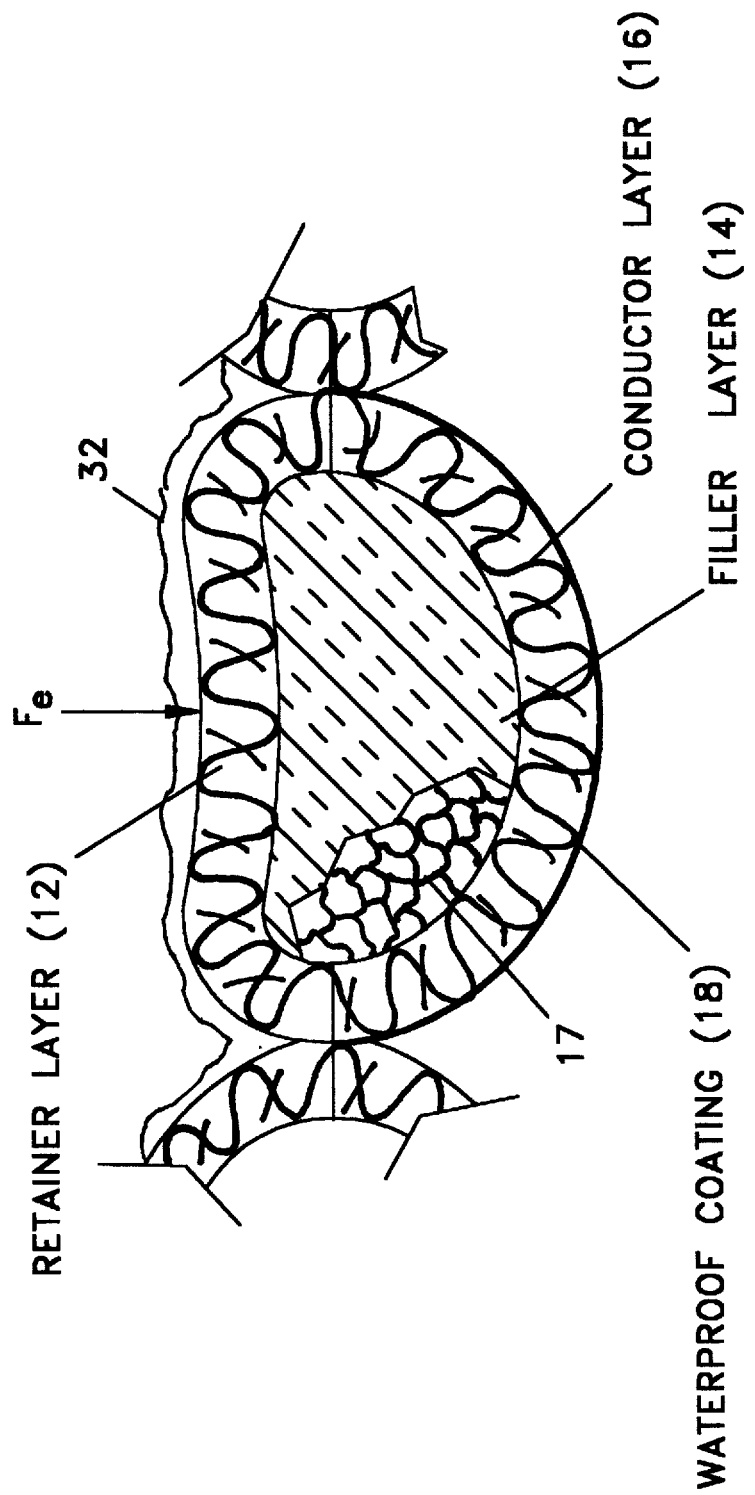
FIG. 9 is an enlarged sectional view of a pocket having been deformed to the extent that polymer material from the filler layer have been forced outwardly through the retainer layer.

Referring now to FIG. 8, the ballistic layer 22 is illustrated as having been impacted by a bullet "B". It will be noted that, because of the stiffness of the ballistic layer, the impact of the bullet "B" has been spread over a relatively large area which encompasses a proportionally large number of pockets 27. It will be noted that the impact has caused considerable deformation and compression of the affected pockets. As the volume of the impacted pockets decreases, the pressure within the pockets will increase rapidly, as illustrated by the force arrows "Fii" in FIG. 8. Since the liquid within the polymer particles is incompressible, it is apparent that if the pressures within the pockets are not relieved to some extent, the pockets will burst under the severe impact of the bullet. Because of the characteristics of the polymers from which these particles 17 are formed, effective removal of the water from the polymer can only be accomplished by means of evaporation. After soaking, polymer particles 17 are transformed from tiny solid particles to a much enlarged gelatin-like mass(see 19 FIG. 9). An attempt to squeeze the water from the enlarged particle by compression of the particle results in a breakdown of the structural integrity of the particle into smaller pieces which continue to retain the absorbed water. As mentioned previously, this characteristic of the polymer provides an extremely effective medium for use as a shock absorbing substance. As is well known, water by itself is considered to be incompressible. Water and many other liquids are used for shock absorbing purposes by encapsulation in a container which is sealed except for a small opening which permits its expulsion under a controlled rate. To use water, per se, in a garment having numerous individual containers (pockets) would obviously be impractical. However by holding the water within a polymer, the properties of water when combined with the polymer provide an effective shock absorbing medium. Use of the saturated polymer as a shock absorbing medium is accomplished by encapsulation of a predetermined amount of water saturated polymer particles within a fabric pocket of a predetermined size. By controlling the amount of polymer in proportion to the size of the pocket a positive pressure will be exerted upon the inner surfaces of the pocket by the expanding polymer particles as they are exposed to water. Thus, it will be readily understood that application of an external compression of the pocket such as would be caused by an impact to the pocket, will deform and decrease the volume of the pocket. An increasing of the internal pressure results as the volume of the pocket is reduced. If the polymer were to be totally saturated and assuming the fabric to be water proof, it will be understood that the incompressibility of the water within the polymer particles would cause the pocket to rupture if the force became to great. While a small amount of energy would be absorbed during this process the abrupt rupture of the pocket would cause immediate loss of resistance to the impact. To prevent such a rupture, a portion of the fabric of the pocket is fabricated of a material having a porosity which will permit expulsion of masses of the saturated polymer particles 17 through the pores of the fabric at a controlled rate (see FIG. 9). The rate of expulsion is dependent upon the porosity of the material. This expulsion will prevent rupture of the pocket and thus provide an effective means of absorbing the energy created by the impact on the pocket. The expulsion of the saturated polymer is more clearly illustrated in FIG. 8 and enlarged FIG. 9 wherein polymer having been expelled is identified by the numeral 32. As will be apparent, the application of energy from an impact will be more effectively absorbed if the force of the impact is distributed over a number of pockets.

The user of the multi-layered composite, whether it be in the form of garment, a blanket, or whatever the item, is thus provided with an effective protection against impact injuries. As the danger of extreme impacts is increased, such as with police engaged in riot control or other hazardous duties, layers of more rigid materials are utilized to provide a means to distribute the energy of an impact to the largest possible number of pressurized pockets. As compared to the use of a ballistic garment alone, a composite garment including a ballistic layer has proven to reduce the impact on the wearer's body by about 20% when struck by a gunshot.

Tests of this composite in garments for use by firemen, policemen and military personnel have been truly outstanding. These garments are readily adaptable to meet the requirements of the variety of applications mentioned above. For example, to use a garment made from the basic multi-layered composite by a fireman, the retainer layer may simply be sprayed with a fire repellent coating. If required, an additional discrete layer of fire resistant material may be easily added.

Thus, after soaking a garment as described above, the multi-layered composite provides an extremely effective protection to the wearer not only against extreme heat, but also against injury from falling debris as may be encountered by firemen within a burning building.

Figure 10:
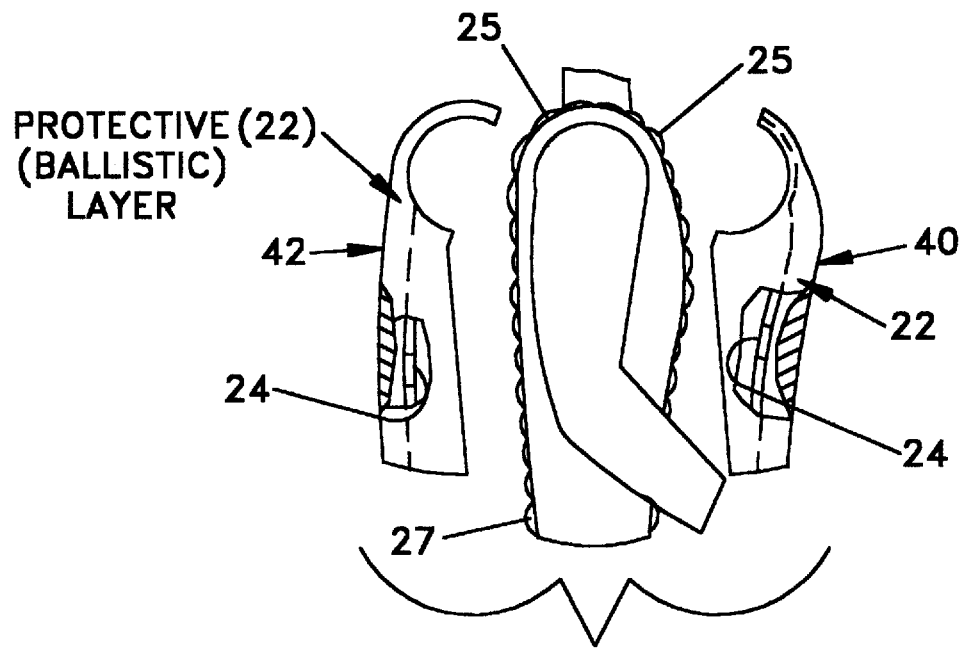
FIG. 10 shows a composite garment illustrating a chest and back protective layer for temporary attachment to a retainer layer to provide personal protection against projectiles such as bullets.
Figure 11:
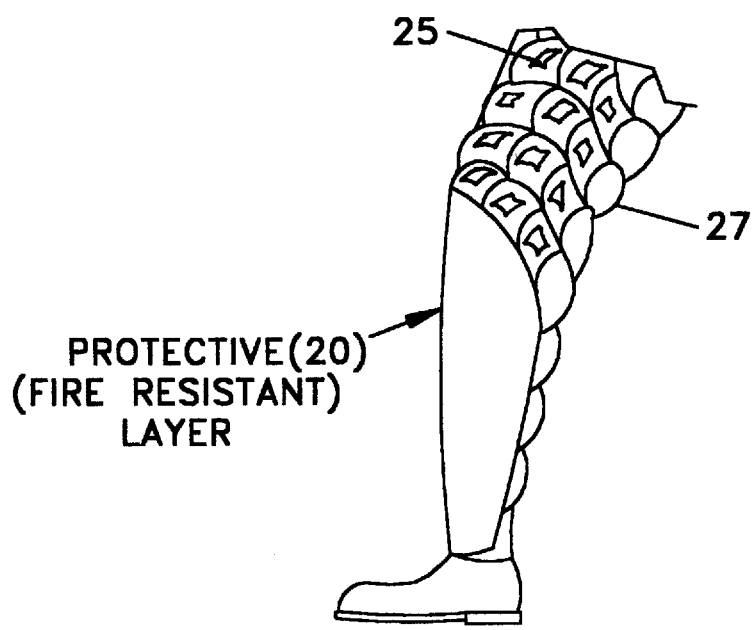
FIG. 11 shows a protective layer in the form of a shin guard which is attached to a retainer layer of a composite garment.
Figure 12:
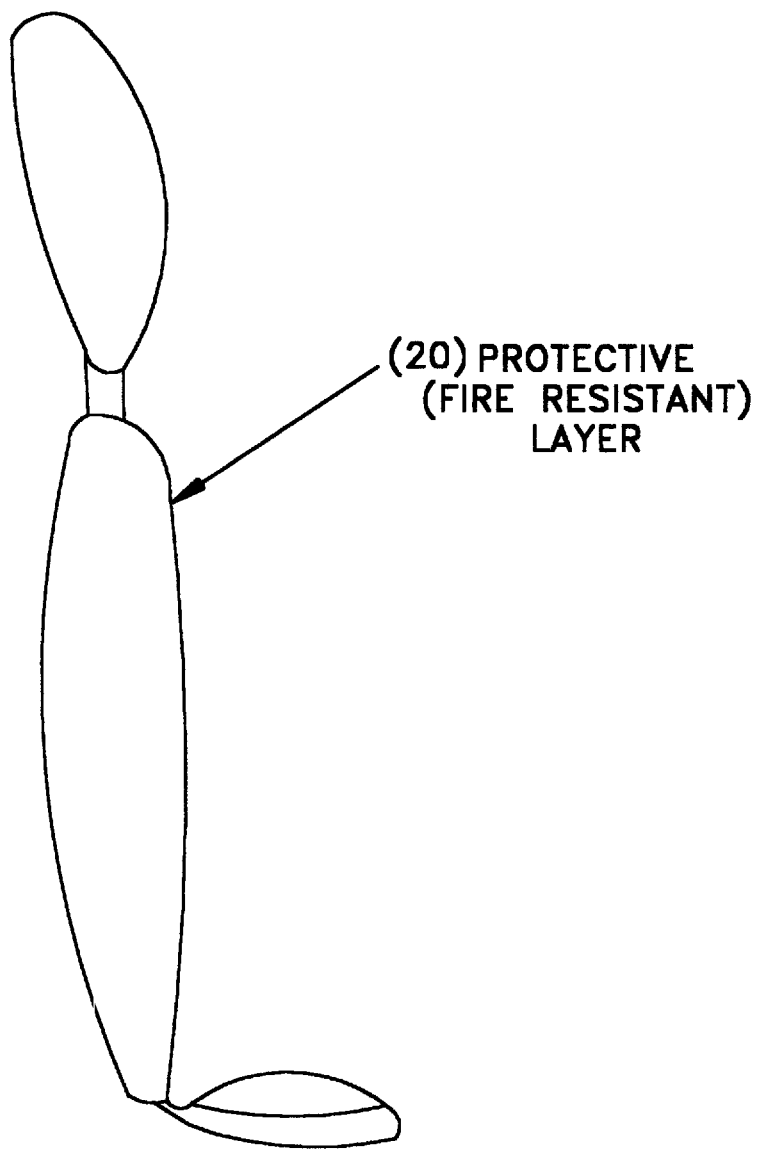
FIG. 12 illustrates a protective layer of a composite wherein a layer is adapted for temporary attachment to the remainder of the composite, for protection of the forward portion of the leg and foot of a person.

In use, any item fabricated from the composite, which is the subject of this invention, is soaked in a liquid such as water for a predetermined time. While a typical soaking period is about 20 minutes, many parameters must be considered in arriving at an optimum soaking period. These parameters include the make up of the composite, as well as its intended application. For example, in applications intended primarily for protection against severe impact, time sufficient to soak the polymer particles to near 100% saturation would be required. If the application is one requiring protection from intense heat, time sufficient to achieve a 50% to 90% saturation would be appropriate. It is pointed out that the degree of saturation is measured experimentally and is converted to a soaking time and/or soaking method. In use, such information is provided with each composite item. More specifically, in an impact protection application, a greater number of particles would be soaked for a longer time so as to exert a greater pressure within each pocket of the composite. It also follows that, within the constraints imposed by the pockets, the greater the expected impact, the higher the original pressure within the pockets should be. As pointed out supra, for protection against the severe impact from bullets and the like, the composite includes a protective layer of ballistic material. This protective layer may be permanently or temporarily attached to the retainer layer. Permanent attachment is made by sewing, gluing or other suitable means and is typically done prior to the quilting process. Temporary attachment of the protective layer is accomplished after completion of the quilting process. This type of attachment is typically accomplished by use of "VELCRO". This attachment is accomplished by fastening patches of "VELCRO" to the outermost surfaces of the retainer portion of the pockets, and by fastening one or more sheets of mating "VELCRO" to inner surface of the ballistic material of the protective layer. In this way the protective layer may be temporarily attached to the retainer layer without the need for alignment of the mating VELCRO™ materials. This temporary fastening arrangement permits the attachment or removal of a selected protective layer to what ever area of the users body may require protection. Thus the user may be clothed in a complete suit of quilted composite without a protective layer. Then any selected configuration of the protective layer may be quickly attached. As illustrated in FIG. 10, a police officer requiring protection from gunfire is provided with a fitted chest and/or back protection layer (numerals 40 and 42 respectively). As illustrated in FIGS. 11 and 12, a fireman fighting a forest fire may be provided with an additional protective layer to the legs for protection against injury from movement through heavy and often thorny underbrush, as well as from the intense heat of the fire. While, typically, the equipment illustrated in FIG. 10 would be used in lieu of existing equipment, it may also be worn under existing fire fighting equipment. As is well known, those fighting forest fires are in serious jeopardy from backfires which close any means of escaping the flames. In this situation, the practice is to lie in a quickly prepared trench, to cover one's body with a blanket and allow the fire to pass over. The use of a soaked blanket fabricated from the composite defined herein provides unequaled protection for this purpose. As pointed out supra the use of such blankets for protection of bedridden persons is also contemplated.

As stated above, with respect to an application requiring protection from intense heat, a saturation of 50% to 90% would be appropriate so as to provide a means of absorbing the perspiration of the user. If the user is perspiring, the perspiration will to a large extent evaporate thus cooling the user. The moisture will then be carried in the form of humid air through the breathable conductive layer and into the filler layer for absorption by the partially saturated particles. Other cooling functions of the composite are also described hereinabove.

Thus, it is understood that a preferred embodiment of the present invention is disclosed which achieves the objectives of the invention as set forth above. However, it should be appreciated that this invention may be implemented in ways other than those disclosed. Variations may also be made with respect to the best mode of practicing this invention without departing from the scope of the invention as set forth in the appended claims.

I claim:

1. A multi-layered, liquid-retaining composite comprising:
   a conductive layer having an inner surface and an outer surface, said inner surface having a water proof, breathable coating whereby liquid is prevented from passing through said coating, but wherein air is permitted to pass therethrough;
   a filler layer impregnated with super-absorbent polymer particles and having a inner surface and an outer surface, said inner surface of said filler layer being in contact with the outer surface of said conductive layer;
   and a retainer layer having an inner surface and an outer surface, the inner surface of said retainer layer contacting the outer layer of said filler layer.

2. A multi-layered, liquid-retaining composite as set forth in claim 1 wherein the outer surface of said retainer layer is provided with protective means.

3. A multi-layered, liquid-retaining composite as set forth in claim 2 wherein said conductive layer, said filler layer and said retainer layer are attached to one another by seams in a generally quilted pattern whereby pockets are formed between said conductive layer and said retainer layer.

4. A multi-layered, liquid-retaining composite as set forth in claim 3 wherein said protective means is a fire resistant coating integrated with the outer surface of said retainer layer.

5. A multi-layered, liquid-retaining composite as set forth in claim 3 wherein said protective means is a discrete protective layer of fire resistant material in contact with the outer surface of said retainer layer.

6. A multi-layered, liquid-retaining composite as set forth in claim 3 wherein said protective means is a discrete protective layer, and, attachment means are provided for attaching said inner surface of said protective layer to the outer surface of said retainer layer.

7. A multi-layered, liquid-retaining composite as set forth in claim 6 wherein said attachment means is disposed for attachment and removal of said protective layer from said retainer layer without damage to either said protective layer or said retainer layer.

8. A multi-layered, liquid-retaining composite as set forth in claim 7 wherein said attachment means is a hook and loop means whereby said protective layer may be repeatedly attached and detached from said retainer layer.

9. A multi-layered, liquid-retaining composite as set forth in claim 8 wherein said protective layer is made of an impact resistant material.

10. A multi-layered, liquid-retaining composite as set forth in claim 9 wherein said filler layer is impregnated with liquid absorbent particles in a quantity sufficient to create an outward pressure within said pockets responsive to soaking in a liquid for a predetermined time so as to become an enlarged gelatin-like mass.

11. A multi-layered, liquid-retaining composite as set forth in claim 10 wherein said retainer layer is formed of a material having a predetermined porosity which permits said enlarged gelatin like mass to be forced through said retainer layer in response to an impact against said protective layer and to thereby reduce the effect of said impact upon a person.

12. A multi-layered, liquid-retaining composite as set forth in claim 11 wherein said protective layer is a rigid ballistic material configured to conform to the shape of the body of said person.

13. A multi-layered, liquid-retaining composite as set forth in claim 12 wherein said ballistic material is at least in part formed of "Kevlar".

14. A multi-layered, liquid-retaining composite as set forth in claim 13 wherein said liquid absorbent particles enlarge in size between 200 and 300 times from a dry size to a wet size responsive to soaking in a liquid for a period of between 15 and 25 minutes.

15. A multi-layered, liquid-retaining composite as set forth in claim 14 wherein the volume of each of said particles when dry is between 0.1 and 2 cubic millimeters.

* * * * *